Dec. 10, 1968 G. K. RUSSELL ET AL 3,416,052

PULSE WIDTH MODULATED POSITION CONTROL CIRCUIT

Filed June 21, 1965 3 Sheets-Sheet 1

INVENTOR.
GEORGE K. RUSSELL
ROBERT E. BURKS
BY
Sheridan and Ross
ATTORNEYS

PULSE WIDTH MODULATED POSITION CONTROL CIRCUIT

Filed June 21, 1965 3 Sheets-Sheet 2

INVENTOR.
GEORGE K. RUSSELL
ROBERT E. BURKS
BY
Sheridan and Ross
ATTORNEYS

Dec. 10, 1968 G. K. RUSSELL ET AL 3,416,052

PULSE WIDTH MODULATED POSITION CONTROL CIRCUIT

Filed June 21, 1965 3 Sheets-Sheet 3

INVENTOR.
GEORGE K. RUSSELL
ROBERT E. BURKS
BY
Sheridan and Ross
ATTORNEYS 3,416,052

PULSE WIDTH MODULATED POSITION CONTROL CIRCUIT

George K. Russell, Denver, and Robert E. Burks, Golden, Colo., assignors to Sundstrand Corporation, a corporation of Illinois Filed June 21, 1965, Ser. No. 465,518
2 Claims. (Cl. 318—18)

ABSTRACT OF THE DISCLOSURE

An electromechanical position control circuit including a pulse width modulation electronic control circuit comprising oscillator circuit means, comparative circuit means, trigger and switch circuit means, solenoid means, transducer circuit means, differential amplifier circuit means, constant current amplifier circuit means, and control reference circuit means. The oscillator circuit means produces a reference signal. The comparator circuit means is coupled to the oscillator circuit means for receiving the reference signal from the oscillator circuit means and a feedback signal from a control loop and for comparing these signals and generating an error signal. The trigger and switch circuit means is coupled to the comparator circuit means for using the error signal to vary the duty cycle of the output from the comparator circuit means. The solenoid means is coupled to the trigger and switch circuit means for receiving the pulse width modulated output of the trigger and switch circuit means for selective actuation of the solenoid means. The transducer circuit means is coupled to the solenoid means for converting output signals from the solenoid means into resistance variations. The differential amplifier circuit means is coupled to the transducer circuit means for amplifying any incremental resistance change in the output resistance of the transducer circuit means from that of a control reference. A constant current amplifier circuit means is coupled to the differential amplifier circuit means for converting the amplified incremental resistance change into a constant current signal and for feeding the constant current signal from the control loop back to the comparator circuit means for generating the error signal. The control reference circuit means is coupled to the transducer circuit means for selectively setting operative thresholds for the control circuit.

This invention relates to a system for the linear control of a solenoid's position and particularly to a system using pulse modulation control of a spring-loaded linear solenoid.

Linear actuators involving the use of pneumatic or hydraulic power, requiring motor-driven components or intermittent electrical contact closure, have certain inherent disadvantages, such as fluid leakage problems, system failures, slow response and low position control accuracy.

Accordingly, it is a primary object of this invention to provide a system for the linear control of a solenoid's position in an electromechanical control system which will not involve the use of pneumatic or hydraulic power.

Another object of this invention is to provide a pulse modulation control system for the linear control of a spring-loaded linear solenoid.

Additional objects of the invention will become apparent from the following description, which is given primarily for purposes of illustration, and not limitation.

Stated in general terms, the objects of the invention are attained by providing an electromechanical solenoid control system including, in combination, an electronic controller, a feedback device, a solenoid actuator and preferably also, though not necessarily, a hydraulic damper.

A more detailed description of a specific embodiment of the invention is given below with reference to the appended drawings, wherein.

Figure 1:
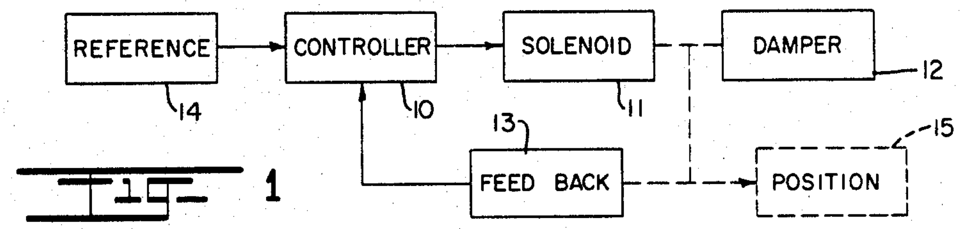
FIGURE 1 is a schematic block diagram showing the control system of the invention.

The four principal components of the system are shown in combination in the block diagram of FIGURE 1 and include the controller 10, the solenoid 11, the damper 12, which is optional, and the feedback device 13. A control reference 14 is associated with controller 10 and a position indicator 15 is associated with solenoid 11, damper 12 and feedback device 13.

The controller 10 will be described with reference to FIGURES 2 and 3. It employs a pulse width modulation circuit which is shown more specifically in the circuit diagram of FIGURE 3.

Figure 2:
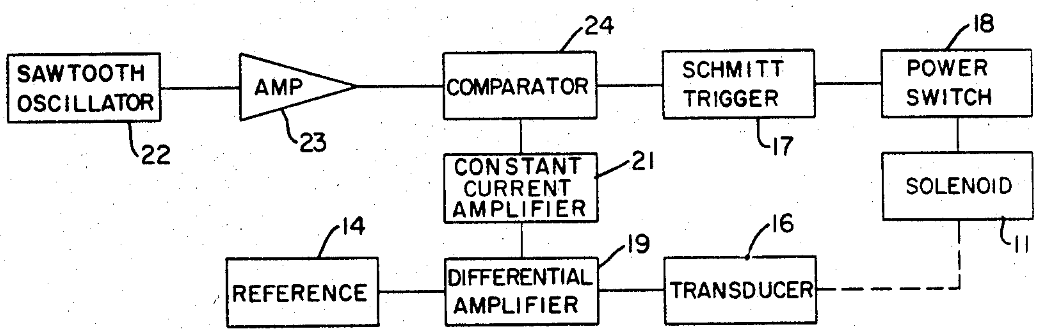
FIGURE 2 is a schematic block diagram showing the electronic controller of the invention.

In the block diagram of FIGURE 2, the feedback transducer 16 serves to convert the output of the control loop, including Schmitt trigger 17, power switch 18 and solenoid 11, into resistance variations. Transducer 16 can be a position, flow, pressure or temperature-sensitive device. Any incremental resistance change in the output resistance variations from that of the control reference 14, is amplified and converted to a constant electric current signal by the differential amplifier 19 and the constant current amplifier 21, respectively. Differential amplifier 19 provides high, stable direct current amplification of a pressure differential sensed by the pressure transducer bridge 16.

Simultaneously, a sawtooth oscillator 22 drives a mixer-amplifier 23, which provides a reference signal to the comparator 24. The analog output of differential amplifier 19 is compared with the sawtooth voltage waveform of oscillator 22 in comparator 24. The positive-going ramp portion of the sawtooth waveform thus produced from amplifier 23 is compared in comparator 24 with a reference voltage developed from the transducer 16 signal output. When the said portion of the waveform coincides with the said reference voltage in comparator 24, the comparator trips Schmitt trigger 17 which, in turn, de-actuates power switch 18 driven thereby. Power switch 18 is regeneratively turned on at the same instant that the retrace portion of the sawtooth waveform from amplifier 23 occurs. The regenerative switch is capable of driving a 30 volt direct current solenoid at 5 amps maximum. Power switch 18 turns off at some point on the ramp of the sawtooth waveform as dictated by the signal from transducer 16. Power switch 18 delivers the maximum operating electric current at a duty cycle which is linearly variable from 0 to 100 percent.

Figure 3:
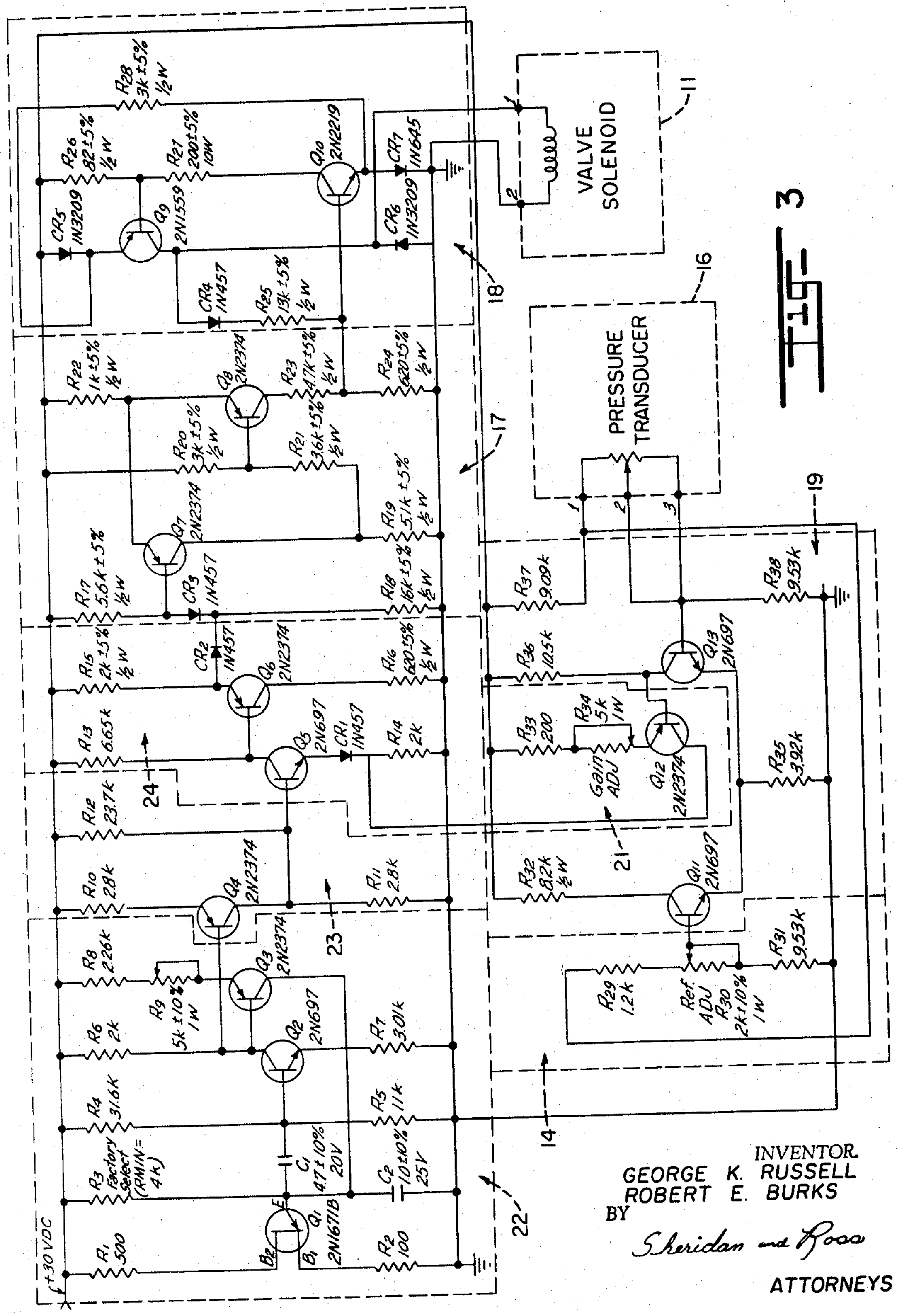
FIGURE 3 is a schematic circuit diagram showing the electronic controller.

The electronic controller 10 of FIGURE 1, illustrated in block diagram form in FIGURE 2, is shown in specific embodiment form in the circuit diagram of FIGURE 3 as applied to control a solenoid 11 which is used to position a flow valve in an electromechanical pressure control loop. All resistor values are in ohms and all capacitor values are in microfarads.

Sawtooth oscillator 22 (Q1) uses the relaxation oscillator configuration for a unijunction transistor. It can be adjusted to a ramp linearity of better than ±1% by potentiometer R9. Although the basic repetition rate is determined by the values of R3 and C2, current feedback through transistor Q3 linearizes the sawtooth ramp voltage.

Circuit elements Q1, R3 and C2 constitute the unijunction transistor relaxation oscillator 22. An active feedback loop is closed around the timing circuitry so that the timing capacitor C2 is charged with a constant current. The voltage at the emitter of oscillator 22 or Q1 increases as capacitor C2 charges to the critical peak voltage of the unijunction transistor Q1. Unijunction transistor Q1 "fires," discharging capacitor C2, and resets for the next cycle when the emitter current decreases to less than the "holding" current. As capacitor C2 charges, transistor Q2 "turns on" and forward biases transistor Q3. Transistor Q3 "feeds back" a charging current to capacitor C2 which is proportional to the ramp voltage linearizing it. Simultaneously, the sawtooth waveform is coupled to the mixer by the amplifier stage Q4 of mixer-amplifier 23.

The circuit design provides for selection of a timing resistor R3 which varies the repetition frequency from 200 to 500 PPS. The feedback loop is adjustable so that the ramp portion of the sawtooth wave from mixer-amplifier 23 can be accurately linearized. The sawtooth waveform at the feedback stage drives an inverting amplifier Q4, which provides isolation between sawtooth oscillator 22 and comparator 24.

Pressure transducer 16 biases one side of differential amplifier 19; that is, Q13 relative to Q11. The bias on the opposite side of differential amplifier 19; that is, Q11, is adjustable to any reference pressure between 70 and 150 p.s.i. through reference 14. Differential amplifier 19 selects the control pressure range. A bridge configuration provides the bias for each side of differential amplifier 19. Pressure transducer 16, which exhibits a gain of 10K per 500 p.s.i., biases transistor Q13 while reference adjust potentiometer R30 provides the bias for transistor Q11. The voltage drop across terminals 1–2 of pressure transducer 16 increases with increasing pressure until it equals the voltage drop across R29 and R30. At this pressure Q13 starts to "turn on" and Q11 starts to "turn off." Transistor Q13 "turns on" transistor Q12 which provides the reference current to comparator 24. The bridge which drives differential amplifier 19 is always balanced due to the common positive connection of pressure transducer 19 and reference resistors R29 and R30. Hence, dynamic loading of the bridge by pressure transducer 16 or differential amplifier 19 does not affect its pressure control point. The control pressure range is inversely proportional to the value of gain adjust potentiometer R34. This circuit discriminates an adjustable ±1 p.s.i. to ±10 p.s.i. control range from 60 p.s.i. to 180 p.s.i. and provides a linearly varying output reference current from 0 to 5 milliamperes.

Hence, by adjusting reference potentiometer R30, the threshold pressure at which the control circuitry of controller 10 (FIGURE 1) just becomes operative is ascertained by the 2K potentiometer R30 of reference 14. As pressure increases, constant current amplifier 21 (Q12) "turns off." The gain of constant current amplifier 21 (Q12) is adjusted from ±1 to ±10 p.s.i., as mentioned above, through gain adjustment potentiometer R34. When gain adjustment potentiometer R34 is in its shorted configuration, the input voltage of differential amplifier 19 (Q11 and Q13) need change only 20 mv. per 4.0 milliampere increment of current. When gain adjust potentiometer R34 is increased to 4.5K, the input voltage of differential amplifier 19 (Q11 and Q13) must change 200 mv. per 4.0 milliampere increment of current. Hence, the adjustable voltage gain change ratio is 200 mv. divided by 20 mv. or 10.

Comparator 24 converts the reference current into a reference voltage which back-biases modulating transistor Q5. The sawtooth voltage waveform forward biases transistor Q5. Until the reference current increases to 1 milliampere, transistor Q5 is continuously "turned on" by voltage dividers R12 and R11. As this reference current increases, transistor Q5 remains back-biased until the sawtooth voltage ramp increases sufficiently to forward-bias it. As transistor Q5 "turns on," transistor Q6 also "turns on." The voltage drop across resistor R15 increases until diode CR2 becomes back-biased and Schmitt trigger 17 "trips."

Schmitt trigger 17 is formed by transistor stages Q7 and Q8 and diode CR3. If transistor Q6 is "turned off," transistor Q7 is "held off" by voltage divider R15 and R18. As the voltage drop across R15 increases, diode CR2 becomes back-biased and transistor Q7 is forward-biased. As transistor Q7 "turns on," transistor Q8 is "turned off" through resistor R19. Additional regenerative current feedback through the common emitter resistor R22 enhances the rapid switching characteristics of this circuit. In other words, the first stage Q5 of comparator 24 is forward-biased by the sawtooth waveform from amplifier 23 (Q2, Q3 and Q4). Constant current amplifier 21 (Q12) provides an isolated back-bias current to the emitter electrode of the first stage Q5, of comparator 24. When the ramp of the sawtooth waveform increases to a voltage value of sufficient magnitude to "turn on" the first stage transistor Q5, the second stage Q6 of comparator 24 also "turns on." The coupling diode CR2 becomes back-biased, permitting the first stage Q7 of Schmitt trigger 17 (Q7 and Q8) to "turn on." Hence, the second stage Q8 is regeneratively "turned off." As the sawtooth wave retraces each cycle, comparator 24 (Q5 and Q6) "turns off," driving the first stage Q7 of Schmitt trigger 17 into cutoff. Then, the second stage Q8 of Schmitt trigger 17 regeneratively "turns on."

Power switch 18 (Q9 and Q10) is driven in-phase with the second stage Q8 of Schmitt trigger 17. Two stages of amplification (Q9 and Q10) are required to drive the heavy load of solenoid 11. A regenerative local feedback loop is closed around these two stages (Q9 and Q10) to insure that the high dissipation dwell time of the transistors is minimized. Consequently, the junction temperature of the output germanium transistor Q10 never exceeds ambient temperature by more than a few degrees.

Restated in more detail, solenoid valve driver or power switch 18 includes the two transistor stages Q9 and Q10. Schmitt trigger 17 switches the first stage Q10 "on" or "off" regeneratively. Transistor Q10, in turn, switches transistor Q9. Since transistor Q9 is capable of driving a 5 ampere solenoid load 11, its output voltage is fed back to insure that transistor Q10 saturates during "turn on." Hence, dwell time in the high dissipation switching region is minimized. In addition, the voltage feedback circuitry is "closed" with just insufficient gain to "lock up" the output switch 18. Output transistor Q9 is protected by diode CR6 from the induced "back E.M.F." of the solenoid valve load 11.

This pulse width modulation technique can be directly integrated with any transducer 16 with a variable direct current, voltage or resistance output. Hence pressure, temperature, flow rates, etc., can be controlled with the same controller. If a transducer 16 requiring alternating current excitation is used, a frequency-to-analog voltage preamplifier conditions the transducer 16 parameter to drive the differential amplifier 19. Hence, transducers such as a differential transformer may be used for this application.

Although FIGURE 3 does not show it, a power supply and 30 volt direct current regulator are included in actual practice in the circuit of controller 10. Hence, the only raw power required is standard, commercial 115 volt, 60 cycle power. In addition, a recorder-driver circuit (not shown) is included. This circuit simultaneously translates the transducer parameter into a linearly proportional output current or voltage. The control range as well as the absolute parameter value of the control circuit 10 may be easily conditioned for instrumentation and/or system feedback. With only minor circuitry changes widely different control ranges and references can be utilized. Remote control of references and ranges is also practical. This system may also be used in remote locations. By virtue of its minimal "off" power requirements, battery powered applications are especially attractive where this control system is used for short duration operations.

Although the control circuitry described with reference to FIGURE 3 is used to provide pulse width modulation control of the average current supplied to solenoid 11, and therefore average force output of the control circuit, any rectangular waveform capable of being filtered by the coil of solenoid 11 can be used. Satisfactory control also can be attained by using the error signal to provide, electronically, a rectangular waveform which is modulated, by the error, to supply other pulse frequency modulation or pulse amplitude modulation waveforms to the coil of solenoid 11. In another modification, the control circuit could be used as part of a sampled data control. In the embodiment, the input to the controller is a pulse code train, rather than a direct current voltage or circuit, which is ultimately used to power the solenoid. To provide the most practical and functional capability, the controller's input circuitry would be of the plug-in type. This permits the input stage to be easily changed to match the characteristics of the transistor 16 being used. The output stage of the controller circuitry also would be of a plug-in design so that the controller could be used to handle solenoids of a wide range of loading characteristics; that is, inductance and coil resistance.

Figure 4:
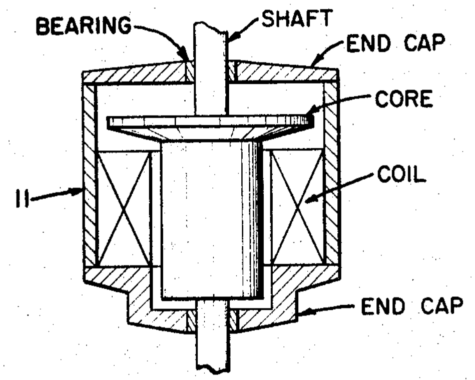
FIGURE 4 is a sectional elevational view showing a constant actuating force solenoid.

Solenoid 11, as shown in FIGURE 4, is of a particular design having a constant actuating force over 90 percent of its stroke length. One way of obtaining this characteristic is by selective saturation of the flux path of the solenoid. This can be accomplished by variation of the solenoid's effective iron area, or length, with stroke. Such a design is shown in FIGURE 4. A particular magnetic density material is chosen to provide a constant magnetomotive force. The solenoid armature configuration is dimensioned so that the magnetomotive force variation in the air gap, which varies with the stroke, is exactly compensated by the change in magnetomotive force of the saturated iron in the magnetic circuit. This provides an actuator having an operating force level which is constant over the full stroke range of the actuator with inherent actuation linearity.

Figure 5:
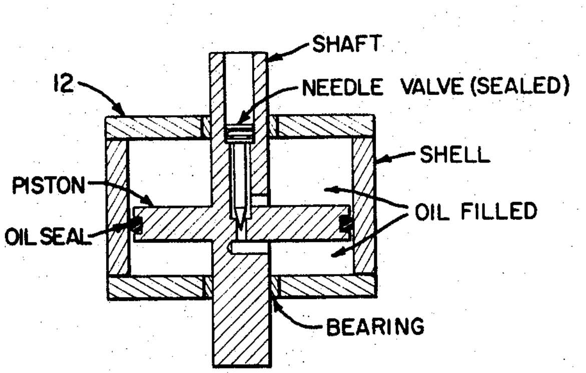
FIGURE 5 is a sectional elevational view showing a hydraulic damping device.

Hydraulic damper 12, as shown in FIGURE 5, is of a design used to provide a force which is proportional to the velocity of solenoid 11, and in opposition to the solenoid force. The use of the sealed needle valve in damper 12 permits solenoid 11 to have adjustable speeds of response. Furthermore, the use of hydraulic damper 12 allows higher system gains, resulting in improved control accuracy, which can be used in practice before stability problems become a noticeable factor. The use of damper 12 also facilitates the making of a change in the type of control system employed. As a Type One control, the steady state position errors can be reduced to zero. Without the use of damper 12, it would be necessary to use electronic integration to obtain Type One control. Hydraulic damper 12 improves the capabilities of solenoid 11 to such an extent that its inclusion is justified in actual practice. However, it is to be understood that the use of hydraulic damper 12 in the system with solenoid 11 is not a necessity. Furthermore, hydraulic damper 12 should not be used with solenoid 11 where rapid response of the solenoid is of primary importance.

Pressure transducer 16 can be of any type suitable for electronic control purposes. The input circuitry of electronic controller 10 is designed to be compatible with the characteristics of transducer 16 employed.

Figure 7:
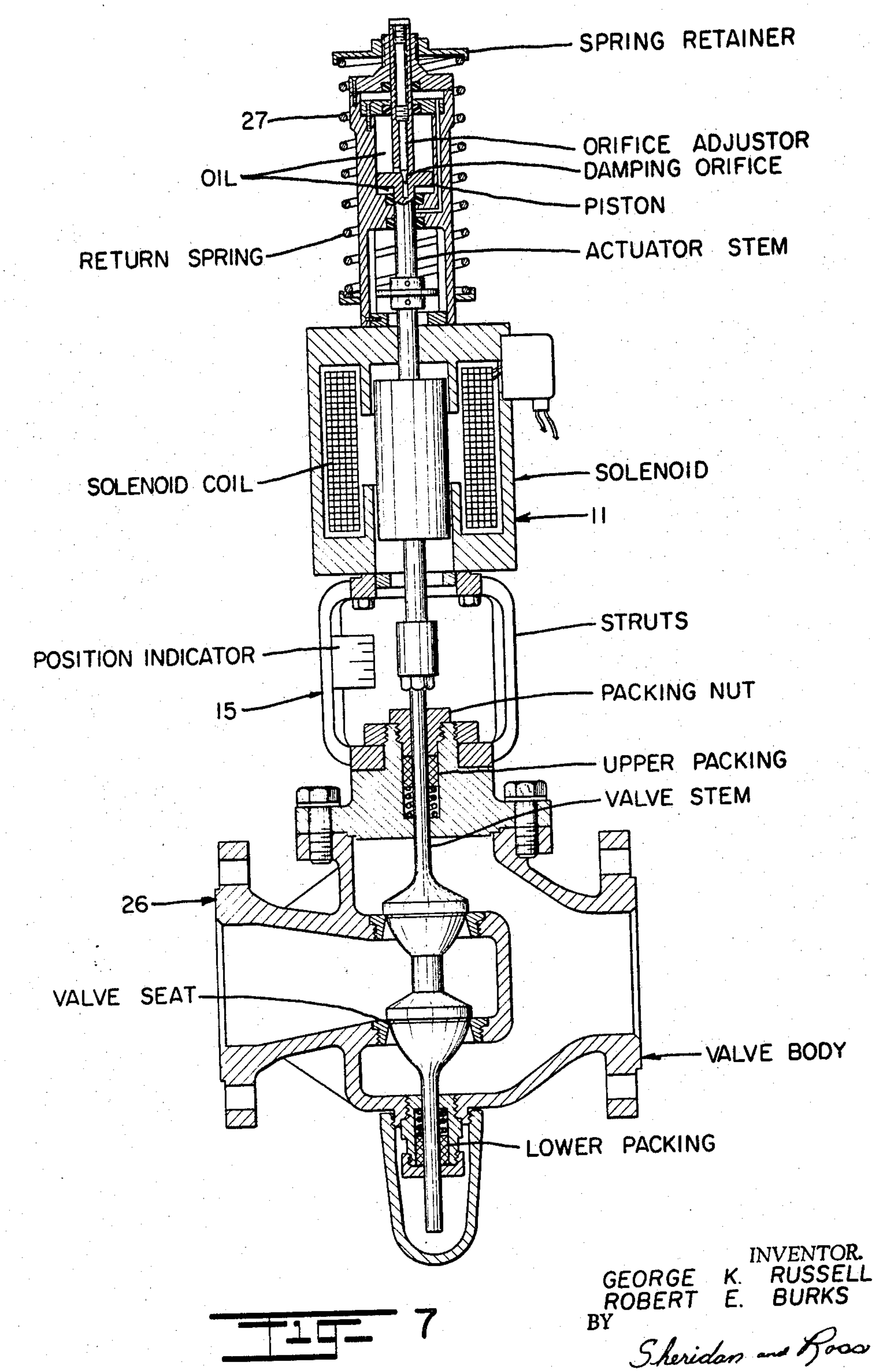
FIGURE 7 is a vertical sectional view showing a typical application of the system to a flow control valve.

In describing the operation of the control system of the invention below, reference is made to FIGURE 1, schematically showing the arrangement of the basic elements of the system, and to FIGURE 7 showing a phyiscal assembly of hydraulic damper 12, solenoid 11 and position indicator 15 on a flow control valve 26.

The input to electronic controller 10 is a low voltage, or electric current, signal which is representative of the desired output of the control system, such as pressure, temperature, fluid flow or position of a valve. The output signal is summed up or integrated with the feedback signal to generate an error signal. The error signal at this point is a function of the difference between the input, or reference, signal and the feedback, or controlled variable, signal. This error signal is used to vary the pulse width, or duty cycle, of a square wave train passing from controller 10 to the coil of solenoid 11. Increasing the pulse width, or duty cycle, of the square wave train entering the coil of solenoid 11 increases the coil current and the magnetic field strength of the coil; whereas, a decrease in the pulse width decreases the solenoid coil current and the magnetic field strength of the coil. The armature or core of solenoid 11 moves with a force that is substantially proportional to the field strength of the solenoid coil, until this moving force is canceled by the opposing force of return spring 27. In the limit, or full "on" condition of the pulse width, a 100 percent duty cycle moves the core and shaft of solenoid 11 to their fully energized positions. On the other hand, at minimum pulse width, or zero percent duty cycle; that is, full "off" condition, the core and shaft of solenoid 11 are urged by return spring 27 to the deenergized position of the solenoid.

The electric current of the square wave train passing from electronic controller 10 to solenoid 11 is filtered and integrated or summed up by the inductive reactance of the solenoid coil, producing in the coil a pulsating direct current. This pulsating direct current provides solenoid 11 with an actuating force which is proportional to the square of the average current level of the pulsating direct current in the coil of the solenoid. The frequency of the square wave train from controller 10 to solenoid 11 is adjusted to achieve adequate, or low ripple amplitude, filtering of the square wave by the solenoid coil.

Figure 6:
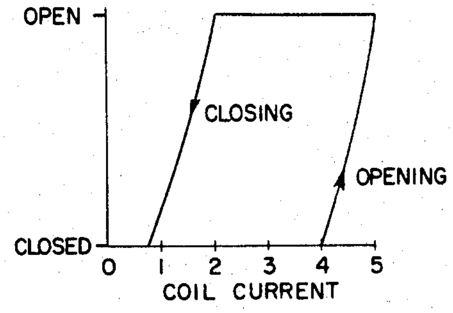
FIGURE 6 is a graph showing a typical solenoid characteristic.

While using a solenoid 11 having a typical characteristic, as shown in FIGURE 6, a pulse width, or duty cycle, of the square wave passing from controller 10 to the solenoid from 80 to 100 percent is required to initiate solenoid core or armature motion in the actuated direction. On the other hand, a pulse width or duty cycle from 20 to 0 percent is required in the square wave to initiate solenoid armature motion in the deenergized direction. For prevailing duty cycles from 20 to 80 percent the solenoid armature is stationary. This duty cycle range is traversed in microseconds by the electronic circuitry of electronic controller 10. The closed loop hysteresis of the control system is essentially that of feedback device 13, which is very small. The relatively large solenoid hysteresis is absobed by the electronics.

Although the use of hydraulic damper 12 in the control system is unnecessary for stable control, its inclusion gives several advantages. It permits adjustable speed of response through the use of a needle valve setting; the use of very high proportional gains, or extreme position accuracy, with proportionately slower response times; action of the closed loop system as a Type One servo mechanism, or zero error, when large amounts of damping are used; and solenoid 11 to be unaffected by extraneous forcing functions by the shock absorbing function of the damper.

As solenoid response times and force levels are a function of their design, solenoids that can react in milliseconds, or in seconds, with force levels from ounces to hundreds of pounds, can be built, and powered with the control system of FIGURE 1. Because the control system of FIGURE 1 can be used to drive solenoids of any force magnitude, from ounce to hundreds of pounds, small solenoid-operated pneumatic or hydraulic valves can be turned into flow control devices. Any application or problem requiring linear motion control, at low to medium force levels, can be filled or solved by the use of the electronic control system of this invention.

The control system of this invention also can be used to reduce the hysteresis effects in torque motor actuated servo valves, or comparable servo devices, which already are in use in the control field. FIGURE 7 illustrates one typical application of the control system of the invention for flow control to meet an existing processing plant application. Among other typical applications for the control system of the invention are: an actuating device for the first stage of a low-priced servo valve, a direct actuator for flow control valves, an electromechanical positioner for automatic machinery and a positioner used for materials handling or processing lines. Other applications of the control system of the invention include situations where all the linear motion is required to be electrically operated and those situations where the use of any plumbing or auxiliary equipment associated with pneumatic or hydraulic systems is objectionable.

Obviously, many other applications, modifications and variations of the electronic control system of the invention are possible in the light of the teachings given hereinabove. It is, therefore, to be understood that, within the scope of the appended claims, the invention can be practiced otherwise than as specifically described.

What is claimed is:

1. An electromechnical control system including a pulse width modulation electronic control circuit which comprises: oscillator circuit means for producing a reference signal representative of the desired output of the control system; comparator circuit means coupled to the oscillator circuit means for receiving the reference signal from the oscillator circuit means and a feedback signal from a control loop and for comparing these signals and generating an error signal; trigger and switch circuit means coupled to the comparator circuit means for using the error signal to vary the duty cycle of the output from the comparator circuit means; solenoid means coupled to the trigger and switch circuit means for receiving the pulse width modulated output of the trigger and switch circuit means for selective actuation of the solenoid means; transducer circuit means coupled to the solenoid means for converting output signals from the solenoid means into resistance variations; differential amplifier circuit means coupled to the transducer circuit means for amplifying any incremental resistance change in the output resistance of the transducer circuit means from that of a control reference; constant current amplifier circuit means coupled to the differential amplifier circuit means for converting the amplified incremental resistance change into a constant current signal and for feeding the constant current signal from said control loop back to the comparator circuit means for generating said aforementioned error signal; and control reference circuit means coupled to the transducer circuit means for selectively setting operative thresholds for the control circuit.

2. An electromechanical control system including a pulse width modulation electronic control circuit which comprises: oscillator circuit means for producing a reference signal representative of the desired output of the control system; comparator circuit means coupled to the oscillator circuit means for receiving the reference signal from the oscillator circuit means and a feedback signal from a control loop and for comparing these signals and generating an error signal; Schmitt trigger circuit means coupled to the comparator circuit means for selective activation by the comparator circuit means output signal; power switch circuit means coupled to the Schmitt trigger circuit means for selective actuation by the output signal of the Schmitt trigger means, said Schmitt trigger circuit means and said power switch circuit means serving to use said error signal generated by the comparator circuit means to vary the duty cycle of the output from the comparator circuit means; solenoid means coupled to the power switch circuit means for receiving the pulse width modulated output of the power switch circuit means for selective actuation of the solenoid means; transducer circuit means coupled to the solenoid means for converting output signals from the solenoid means into resistance variations; differential amplifier circuit means coupled to the transducer circuit means for amplifying any incremental resistance change in the output resistance of the transducer circuit means from that of a control reference; constant current amplifier circuit means coupled to the differential amplifier circuit means for converting the amplified incremental resistance change into a constant current signal and for feeding the constant current signal from said control loop back to the comparator circuit means for generating said aforementioned error signal; and control reference circuit means coupled to the transducer circuit means for selectively setting operative thresholds for the control circuit.

References Cited

UNITED STATES PATENTS

| | | | |
|---|---|---|---|
| 3,213,343 | 10/1965 | Sheheen | 318—341 |
| 3,223,912 | 12/1965 | Sheheen | 318—341 |
| 3,295,421 | 1/1967 | McCormick | 317—148.5 |
| 3,358,206 | 12/1967 | Thiele | 318—341 |

BENJAMIN DOBECK, *Primary Examiner.*

U.S. Cl. X.R.

317—148.5; 318—28